United States Patent
Quartarone et al.

[11] Patent Number: 5,878,778
[45] Date of Patent: Mar. 9, 1999

[54] ELASTOMERIC CUT-OFF VALVE

[75] Inventors: James R. Quartarone, Newport, R.I.; John J. Quartarone, Dedham, Mass.

[73] Assignee: The United States of America as represented by the Secretary of the Navy, Washington, D.C.

[21] Appl. No.: 954,886

[22] Filed: Oct. 9, 1997

[51] Int. Cl.⁶ .................................................. F16K 15/00
[52] U.S. Cl. .................... 137/517; 137/844; 137/843; 137/845
[58] Field of Search .................... 137/843, 844, 137/845, 517; 138/45

[56] References Cited

U.S. PATENT DOCUMENTS

| | | | |
|---|---|---|---|
| 2,764,183 | 9/1956 | Gollehon | 137/517 |
| 2,781,059 | 2/1957 | Frey | 137/517 |
| 2,816,572 | 12/1957 | Pratt | 137/517 |
| 2,878,836 | 3/1959 | Binks | 137/517 |
| 2,910,093 | 10/1959 | Dahl | 137/517 |
| 2,926,686 | 3/1960 | Gheen | 137/517 |
| 2,939,487 | 6/1960 | Fraser et al. | 137/517 |
| 2,941,544 | 6/1960 | Peras | 137/517 |
| 2,948,300 | 8/1960 | Fraser | 137/517 |
| 3,087,761 | 4/1963 | Stelzer | 137/517 |
| 3,586,040 | 6/1971 | Urback | 137/517 |
| 3,970,105 | 7/1976 | Pelton et al. | 137/517 |
| 4,105,050 | 8/1978 | Hendrickson et al. | 137/517 |

*Primary Examiner*—Denise L. Ferensic
*Assistant Examiner*—Joanne Kim
*Attorney, Agent, or Firm*—Michael J. McGowan; Prithvi C. Lall; Michael F. Oglo

[57] ABSTRACT

A cut-off valve consists of a hollow rigid body and a flexible or supple perforated plug. The plug defines a flow pate therethrough and is sealed in the rigid body between the rigid body's inlet and outlet to define a free volume in the rigid body between the inlet and the plug. The plug flexes or deforms in response to a differential pressure thereacross to collapse into the flow path when the differential pressure exceeds a predetermined threshold thereby stopping the flow.

13 Claims, 1 Drawing Sheet

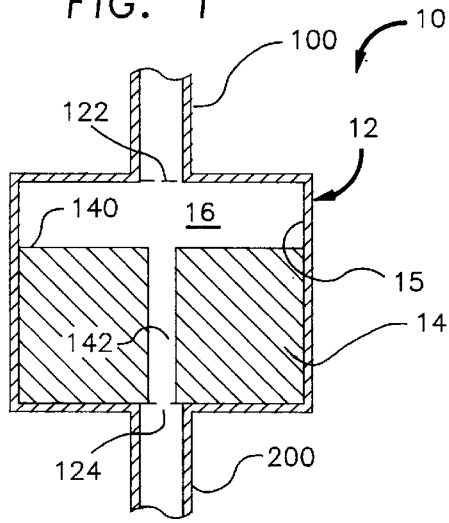
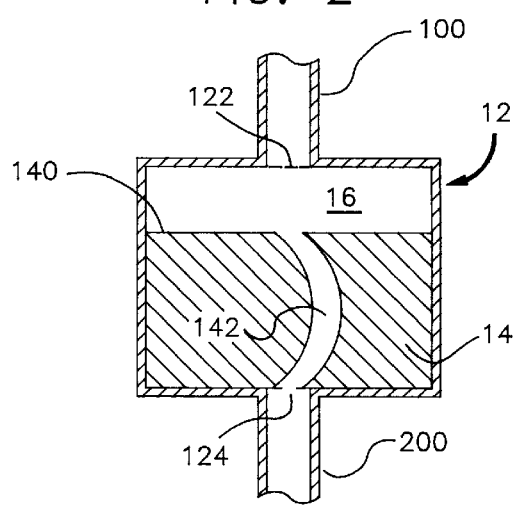
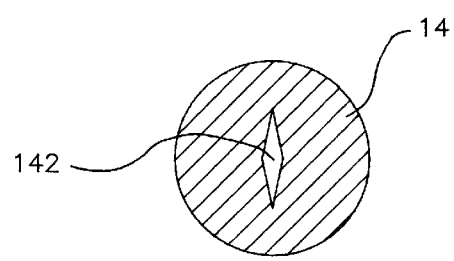
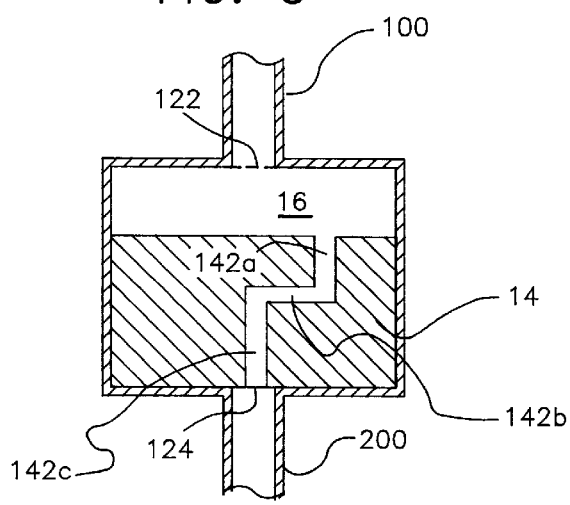
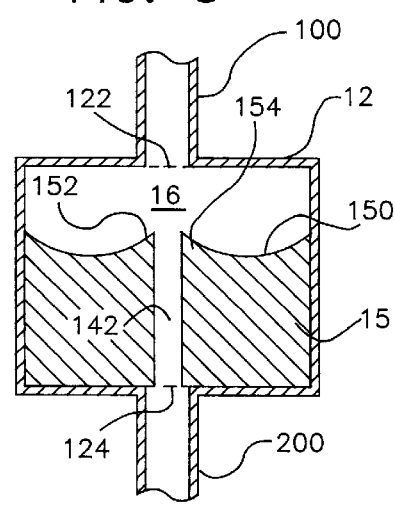

ELASTOMERIC CUT-OFF VALVE

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to valves, and more. particularly to a valve for cutting off flow when the pressure differential thereacross exceeds a predetermined threshold.

(2) Description of the Prior Art

Traditional (high or low-pressure) cut-off valves require mechanical or electrical actuation. However, the complexity and/or cost associated with such cut-off valves can make them impractical for many applications. Further, a particular application may not have the space needed for the installation of the valve's associated actuation mechanism. Finally, since many cut-off valves close and re-open at the same pressure threshold, the valve will tend to chatter if the pressure differential thereacross rapidly fluctuates about the close/re-open pressure threshold.

SUMMARY OF THE INVENTION

Accordingly, it is an object of the present invention to provide a cut-off valve that permits flow up to a predetermined pressure and prevents flow at pressures exceeding the predetermined pressure.

Another object of the present invention is to provide a cutoff valve that requires no mechanical or electrical actuators.

Still another object of the present invention is to provide a cut-off valve that has a pressure hysteresis for its open/close/re-open operation in order to prevent valve chatter.

Other objects and advantages of the present invention will become more obvious hereinafter in the specification and drawings.

In accordance with the present invention, a cut-off valve consists of a hollow rigid body or housing and a flexible or supple perforated plug. The rigid body has an inlet and an outlet and forms a chamber therebetween. The perforation in the plug defines a flow path therethrough. The plug is sealingly installed in the chamber between the rigid body's inlet and outlet to define a free volume in the rigid body between the inlet and the plug. The plug flexes or deforms in response to a differential pressure thereacross such that it collapses into the flow path when the differential pressure exceeds a predetermined. threshold.

BRIEF DESCRIPTION OF THE DRAWING(S)

Other objects, features and advantages of the present invention will become apparent upon reference to the following description of the preferred embodiments and to the drawings, wherein:

FIG. 1 is a cross-sectional view of one embodiment of a cutoff valve in its open position in accordance with the present invention;

FIG. 2 is a cross-sectional view of an alternative embodiment cut-off valve in which the passageway through the plug section is curvilinear;

FIG. 3 is a cross-sectional view of an alternative embodiment cut-off valve in which the passageway through the plug section is a series of linear passageways connected at angles with one another;

FIG. 4 is a top view of one embodiment of the plug section showing a passageway having a cross-sectional shape of an oblique parallelogram; and FIG. 5 is a cross-sectional view of an alternative embodiment cut-off valve in which the free surface of the plug section is shaped to provide a greater magnitude of valve hysteresis.

DESCRIPTION OF THE PREFERRED EMBODIMENT(S)

Referring now to the drawings, and more particularly to FIG. 1, one illustrative embodiment of a cut-off valve 10 is shown in cross-section as it would be installed between an inlet flow conduit 100 and outlet flow conduit 200. Valve 10 consists of a hollow rigid body or housing section 12 and a flexible perforated plug section 14 contained therein. Body section 12 forms a chamber 15 which communicates between conduits 100 and 200, and it can be constructed from any rigid material (e.g., metal, plastic, composite, etc.) capable of restraining plug section 14 throughout its range of operation and withstanding the flow pressures of the particular application. The shape of chamber 15 is of no consequence with respect to the present invention except that it be adapted to receive flexible perforated plug section 14 having a body size that is large relative to those of conduits 100 and 200. Body section 12 is provided with inlet opening 122 communicating with inlet flow conduit 100 and outlet opening 124 communicating with outlet flow conduit 200.

Flexible perforated plug section 14 is sealingly installed within chamber 15 by any conventional means (e.g., glue, potting compound, press-fit, molded within body section 12, etc.) so that plug section 14 is restrained on all but one of its surfaces by body section 12. The unrestrained surface, i.e., free surface 140, defines free volume 16 between free surface 140 and inlet opening 122. The perforation through plug section 14 forms passageway 142 which defines a flow path for a flow of fluid passing from inlet flow conduit 100 through valve 10 to outlet flow conduit 200. While only one passageway 142 is shown for ease of illustration, multiple passageways could be used to define the flow path through plug section 14.

Plug section 14 is made from a flexible material (e.g., an elastomer) that will flex under pressure. In general, with respect to the operation of the present invention, plug section 14 is selected so that passageway 142 remains stable for fluid flows up to a threshold pressure differential between free volume 16 and outlet flow conduit 200. Once this threshold is reached, plug section 14 will tend to redistribute its volume where it is not restrained. Since pressure from inlet flow conduit 100 impinges on free surface 140 and since plug section 14 is restrained at all other surfaces by body section 12, only the volume of passageway 142 is available for such redistribution. In other words, once the threshold pressure is reached, plug section 14 collapses into passageway 142 thereby cinching off fluid flow between conduits 100 and 200 and closing the valve. Depending on the choice of material for plug section 14, the size/geometry of passageway 142 and the rate of pressure change in the fluid flow, the collapse of passageway 142 can be designed to be slow or abrupt. For valve 10 to re-open, the pressure in free volume 16 relative to outlet flow conduit 200 must fall below the threshold. As will be explained further below, valve 10 can be designed with a hysteresis so that valve 10 will not reopen until the pressure differential thereacross is less than that required to close valve 10. Alternatively, a material and geometry could be selected for plug section 14 so that flow is permanently cut-off once passageway 142 collapses thereby requiring a replacement of plug section 14. Such a valve may find use in situations where it is desirable to determine the cause of the pressure increase prior to allowing flow to resume.

In terms of a valve designed to re-open once the inlet pressure falls below a predetermined threshold, a variety of elastomer or otherwise supple materials would be suitable for plug section 14. Examples of such materials include: nitrile (acrylonitrile-butadiene copolymers) seal compound available as compound N4121A90 from Parker Seal Group Packing Division, Salt Lake City, Utah; ethylene propylene seal compound available as compound E4207A90 from Parker Seal Group; a fluoromyte seal compound available as Z4653D58 from Parker Seal Group; a molythane seal compound available as compound P4615A90 from Parker Seal Group; a fluorocarbon seal compound available as compound V4208A90 from Parker Seal Group; and Parkerthane seal compound P4611A90 from Parker Seal Group. The stiffer or harder the material used for plug section 14, the greater the pressure differential required to collapse plug section 14 into passageway 142. The term elastomer as used in this specification and the appended claims includes the dictionary meaning, following, and natural rubber. Webster's Third International Unabridged Dictionary, Merriam-Webster, Inc. Publishers, Springfield, Mass. (1961), defines "elastomer" as "an elastic rubber-like substance (as a synthetic rubber or plastic) having some of the physical properties of natural rubber. "

As shown in FIG. 1, passageway 142 is in linear alignment with inlet opening 122 and outlet opening 124. However, the present invention is not so limited. Passageway 142 could be curvilinear as shown in FIG. 2 or define a series of connected linear passageways 142a/142b/142c connected at angles with one another to define a more tortious path through plug section 14 as shown in FIG. 3. If the physical properties of the plug sections are the same, the passageways shown in FIGS. 2 and 3 would collapse more easily than the straight passageway shown in FIG. 1 due to the presence of a passageway component that is transverse to flow pressure.

The cross-sectional shape of passageway 142 is typically circular owing to ease of manufacture. However, the present invention is not so limited. For example, the cross-sectional shape of passageway 142 could be an oblique parallelogram as shown in FIG. 4 which is a top view of one embodiment of plug section 14. While being more difficult to manufacture, an oblique parallelogram passageway is less susceptible to leakage as the sides of the passageway form a close fit when collapsed.

As mentioned above, valve 10 has a hysteresis defined by its closing and opening pressure differentials. Factors affecting this hysteresis include the geometry of plug section 14, the viscoelastic properties of the particular material used for plug section 14, and fluid flow losses. The "visco . . . " prefix in the aforesaid term viscoelastic refers to the property of viscosity. For purposes of interpretation of this specification and the appended claims, the meaning of "viscosity" includes the following definition item "c" provided in Webster's Third International Unabridged Dictionary, Merriam-Webster, Inc. Publishers, Springfield, Mass. (1961): ["viscosity" is t]he property possessed by a solid of yielding continually under a shearing stress." In terms of the geometry of plug section 14, both free surface 140 and passageway 142 contribute to the valve's hysteresis. In general, when passageway 142 is open, there is pressure therein that must be overcome before it collapses. However, once collapsed, there is no longer any pressure within passageway 142 tending to keep it open. The only pressure acting on plug section 14 to force passageway 142 to re-open occurs at either end of passageway 142. Because of this, the pressure threshold to re-open passageway 142 is at least slightly less than the closing pressure threshold. This effect can be decreased/increased by the particular shape of passageway 142.

The shape of free surface 140 of plug section 14 can also affect the valve's hysteresis. For example, as shown in the cross-sectional view of FIG. 5, plug section 15 defines free surface 150 that is concave between the walls of body section 12 and passageway 142. As the pressure differential across plug section 15 increases, plug tips 152 and 154 will tend to flap over passageway 142. The resulting flap-shaped hole in plug section 15 will remain closed at lower pressures than holes without tips 152 and 154. Thus, for the valve in FIG. 5 to reopen, pressure must drop below what would be required if tips 152 and 154 were not present.

The viscoelastic properties of the supple material of which the plug section is made can also affect the hysteresis of the valve. If the plug section were perfectly elastic (i.e., a perfect Hookean solid), it would act like a perfect spring and all the energy put in during the plug passageway's collapse would still be there to help with the re-opening of the passageway. However, rubber-type elastomeric materials will almost always have a significant viscous or damping component to them. The (viscoelastic) elastomer absorbs energy when it collapses into the passageway and retains some of the energy in the mode of recoverable energy of an elastic structure, but also dissipates some of the energy in the mode of fluid/viscous deformations (e.g., converts the energy to heat, noise, etc.). Thus, an elastomer with greater viscous properties would give the valve a greater hysteresis than an elastomer having greater Hookean properties.

Fluid flow losses cause the pressure throughout the valve to decrease in the direction of flow when passageway 142 is open. However, when the passageway is closed, there is no pressure drop in the upstream part of the valve so that the pressure in free volume 16 is the same as the pressure upstream in inlet flow conduit 100. In other words, once the passageway is shut, the pressure in free volume 16 goes up by an amount approximately equal to the line losses upstream thereby helping to maintain the passageway in the collapsed state even as the pressure upstream begins to decrease. A similar but opposite situation occurs on the downstream side of the valve thereby adding to the valve's overall hysteresis. More specifically, when there is flow through the valve, the pressure on the low pressure side of the plug section is somewhat higher than the pressure in outlet flow conduit 200 due to flow losses. However, when the passageway collapses, the pressure on the low pressure side of the plug section will suddenly drop to the same pressure as that in outlet flow conduit 200.

The advantages of the present invention are numerous. The elastomeric cut-off valve of the present invention provides a simple and inexpensive cut-off valve for fluid flows. No electrical or mechanical activation is required as the internal properties of the valve's plug section function to close and open the valve in response to predetermined pressure differentials associated with the particular plug section. The valve's plug section can be designed with suitable hysteresis to minimize chatter. Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A cut-off valve comprising:

a hollow rigid body having an inlet and an outlet; and a flexible plug fitted in said hollow rigid body between said inlet and said outlet, said plug being restrained against interior portions of said hollow rigid body on all exterior surface areas of said plug except for one exterior surface area of said plug, said one exterior surface area of said plug facing said inlet and spaced apart therefrom to define a free volume within said hollow rigid body between said one exterior surface area and said inlet, said plug having a passage therethrough that defines a flow path between said free volume and said outlet wherein, when a differential pressure across said plug is below a predetermined threshold, said flow path remains open and, when said differential pressure exceeds said predetermined threshold, said plug redistributes its volume only into said passage to cut off said flow path.

2. A cut-off valve as in claim 1 wherein said plug is made from an elastomeric material.

3. A cut-off valve as in claim 2 wherein said inlet, said passage and said outlet are in linear alignment.

4. A cut-off valve as in claim 2 wherein said passage is of circular cross-section.

5. A cut-off valve as in claim 2 wherein said passage has a cross-sectional shape that is an oblique parallelogram.

6. A cut-off valve as in claim 2 wherein said passage is non-linear.

7. A valve comprising:

a housing having an inlet and an outlet forming a chamber therebetween;

a supple plug disposed in said chamber and so constructed and arranged to define a free volume section of said chamber in communication with the inlet;

said plug having a perforation therethrough for providing communication between the outlet and said free volume section; and the geometries of said chamber and said plug being so chosen that except for the communication between the outlet and an end of said perforation adjacent the outlet, and except for a portion of the exterior surface of said plug which is contiguous to said free volume section of said chamber, all remaining portions of the exterior surface of said plug are restrained against interior walls of said chamber;

whereby under an increase in differential pressure between the inlet and the outlet, said plug can only deform in a way that blocks said perforation to close the valve.

8. A valve in claim 7 wherein said plug is made of an elastomer material.

9. A valve as in claim 8 wherein the degree of suppleness of said plug, the geometries of said chamber and of said plug, and the flow passage characteristics of said perforation are so chosen to cause the valve to close upon said differential pressure reaching a first predetermined level.

10. A valve as in claim 7 wherein said plug is made of a viscoelastic material.

11. A valve as in claim 10 wherein the viscoelastic properties of said viscoelastic material, said geometries of said chamber and said plug, and said flow passage characteristics of said perforation are so chosen to cause the valve to close upon said differential pressure reaching a first predetermined level.

12. A valve as in claim 11, wherein the viscoelastic properties of said viscoelastic material, said geometries of said chamber and said plug, and said flow passage characteristics of said perforation are so chosen that under a subsequent decrease in said differential pressure, said perforation is unblocked to reopen the valve.

13. A valve as in claim 12 wherein said viscoelastic properties, said geometries, and said flow passage characteristics are further so chosen to cause the valve to reopen upon said differential pressure dropping to a second predetermined level below said first predetermined level.

* * * * *